(12) United States Patent
Tashiro et al.

(10) Patent No.: US 10,696,303 B2
(45) Date of Patent: Jun. 30, 2020

(54) VEHICLE CONTROL DEVICE

(71) Applicant: Hitachi Automotive Systems, Ltd., Hitachinaka-shi, Ibaraki (JP)

(72) Inventors: Naoyuki Tashiro, Ibaraki (JP); Takashi Okada, Ibaraki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 113 days.

(21) Appl. No.: 15/762,727

(22) PCT Filed: Aug. 5, 2016

(86) PCT No.: PCT/JP2016/073034
§ 371 (c)(1),
(2) Date: Mar. 23, 2018

(87) PCT Pub. No.: WO2017/056729
PCT Pub. Date: Apr. 6, 2017

(65) Prior Publication Data
US 2018/0257654 A1    Sep. 13, 2018

(30) Foreign Application Priority Data

Sep. 29, 2015   (JP) .................................. 2015-190625

(51) Int. Cl.
*B60W 30/18*    (2012.01)
*B60W 10/02*    (2006.01)
(Continued)

(52) U.S. Cl.
CPC ...... *B60W 30/18072* (2013.01); *B60W 10/02* (2013.01); *B60W 10/06* (2013.01); *B60W 10/10* (2013.01); *B60W 30/143* (2013.01); *B60W 30/16* (2013.01); *F02D 29/02* (2013.01); *F16D 48/02* (2013.01); *F16H 61/0213* (2013.01); *B60W 2030/1809* (2013.01); *B60W 2030/18081* (2013.01); *B60W 2510/0208* (2013.01); *B60W 2520/10* (2013.01); *B60W 2540/10* (2013.01);
(Continued)

(58) Field of Classification Search
None
See application file for complete search history.

(56) References Cited

U.S. PATENT DOCUMENTS 8,187,149 B2 * 5/2012 Koenig ................ B60W 10/115
477/98
2012/0252630 A1   10/2012 Sasaki
2017/0028990 A1    2/2017 Yokokawa

FOREIGN PATENT DOCUMENTS

EP    2 865 913 A1    4/2015
JP    2006-256477 A   9/2006
(Continued)

OTHER PUBLICATIONS

Extended European Search Report issued in counterpart European Application No. 16850906.5 dated May 7, 2019 (seven (7) pages).
(Continued)

*Primary Examiner* — Timothy Hannon
(74) *Attorney, Agent, or Firm* — Crowell & Moring LLP

(57) ABSTRACT

An engine is driven at an operating point with high engine efficiency to improve fuel economy. A vehicle control device according to the present invention controls a transmission ratio before increasing the engine rotation speed, and thereafter, engages the clutch.

7 Claims, 13 Drawing Sheets

(51) Int. Cl.
- *B60W 10/06* (2006.01)
- *B60W 10/10* (2012.01)
- *F16D 48/02* (2006.01)
- *F02D 29/02* (2006.01)
- *F16H 61/02* (2006.01)
- *B60W 30/16* (2020.01)
- *B60W 30/14* (2006.01)
- *F16H 59/18* (2006.01)

(52) U.S. Cl.
CPC ... *B60W 2554/80* (2020.02); *B60W 2710/021* (2013.01); *B60W 2710/0644* (2013.01); *B60W 2710/0655* (2013.01); *B60W 2710/1005* (2013.01); *B60Y 2300/18083* (2013.01); *F16H 2059/186* (2013.01); *F16H 2061/0234* (2013.01); *F16H 2306/54* (2013.01)

(56) References Cited

FOREIGN PATENT DOCUMENTS

| | | |
|---|---|---|
| JP | 2012-47148 A | 3/2012 |
| JP | 2012-116356 A | 6/2012 |
| JP | 2012-201339 A | 10/2012 |
| JP | 2015-117738 A | 6/2015 |
| WO | WO 2015/068857 A1 | 5/2015 |
| WO | WO 2015/092518 A1 | 6/2015 |

OTHER PUBLICATIONS

Japanese-language Office Action issued in counterpart Japanese Application No. 2017-542992 dated Jan. 8, 2019 with English translation (seven (7) pages).

International Search Report (PCT/ISA/210) issued in PCT Application No. PCT/JP2016/073034 dated Nov. 8, 2016 with English translation (three pages).

Japanese-language Written Opinion (PCT/ISA/237) issued in PCT Application No. PCT/JP2016/073034 dated Nov. 8, 2016 (six pages).

Japanese-language Office Action issued in counterpart Japanese Application No. 2017-542992 dated Sep. 3, 2019 with English translation (eight (8) pages).

\* cited by examiner

VEHICLE CONTROL DEVICE

TECHNICAL FIELD

The present invention relates to a vehicle control device.

BACKGROUND ART

Recently, various techniques for improving the fuel economy of an engine equipped with an internal combustion engine have been developed. PTL 1 discloses, as an object of "providing a vehicle control device capable of securing a long running time or a long running distance due to coasting in a running vehicle", a technique in which, "when a vehicle speed V of the vehicle is within a vehicle speed range determined by a lower limit side vehicle speed V0 and an upper limit side vehicle speed V1, if the vehicle speed V is equal to or higher than the vehicle speed V0, the vehicle control device stops an engine by fuel cut and disengages a clutch to cause the vehicle to run by coasting, if the vehicle speed V becomes lower than the vehicle speed V0, the vehicle control device starts the engine by fuel supply and engages the clutch to perform acceleration (constant speed free run). When it is necessary to stop the vehicle, the vehicle control device stops the engine by fuel cut until the vehicle stops, disengages the clutch, and causes the vehicle to run by coasting (stop free run), and thereafter, engages the clutch to impart braking by the engine brake and the brake device. As a result, it is possible to ensure a long running time and a long running distance due to coasting and to improve fuel economy" (see abstract).

When the clutch is brought into an engaged state and the fuel supply to the engine is stopped and the vehicle is driven (hereinafter referred to as engine brake), the deceleration of the engine brake becomes an addition of engine loss (mechanical loss, intake loss, etc.) to the running resistance. On the other hand, when the vehicle is driven in a state in which the engine is stopped and the clutch is disengaged (also referred to as a stop free run in PTL 1, hereinafter also referred to as "sailing stop"), since the deceleration of the sailing stop is only the running resistance, the deceleration of the sailing stop becomes smaller than the deceleration of the engine brake.

Therefore, in PTL 1, when it is determined that there is a need to stop the vehicle and the distance up to the stop is equal to or larger than a predetermined value, first, the sailing stop is executed, and when the distance up to the stop becomes less than the predetermined value, the vehicle is decelerated with engine brake or brake (see paragraph 0066 or the like). In PTL 1, it is intended to lengthen the engine stop time and improve fuel economy by the above-described operation.

CITATION LIST

Patent Literature

PTL 1: JP 2012-47148 A

SUMMARY OF INVENTION

Technical Problem

According to PTL 1, when the vehicle speed becomes lower than the lower limit vehicle speed, the engine is started, and when the clutch is in an engaged state and accelerated, a transmission ratio is controlled. As a result, it is intended to control the transmission ratio to drive the engine in a best fuel economy range of the engine. However, there is a certain degree of delay when controlling the transmission to a predetermined transmission ratio. Therefore, after starting the engine, the clutch is engaged, and until reaching the operating point with high engine efficiency, it is necessary to drive the engine at an operating point with low engine efficiency, and the fuel economy effect decreases accordingly.

The present invention has been made to solve the above problem, and an object thereof is to drive an engine at an operating point with high engine efficiency to improve fuel economy.

Solution to Problem

A vehicle control device according to the present invention controls the transmission ratio before increasing the rotation speed of the engine, and then engages the clutch.

Advantageous Effects of Invention

According to the vehicle control device of the present invention, the fuel economy can be improved by shortening the time until reaching the operating point with good engine efficiency.

DESCRIPTION OF EMBODIMENTS

First Embodiment

Figure 1:
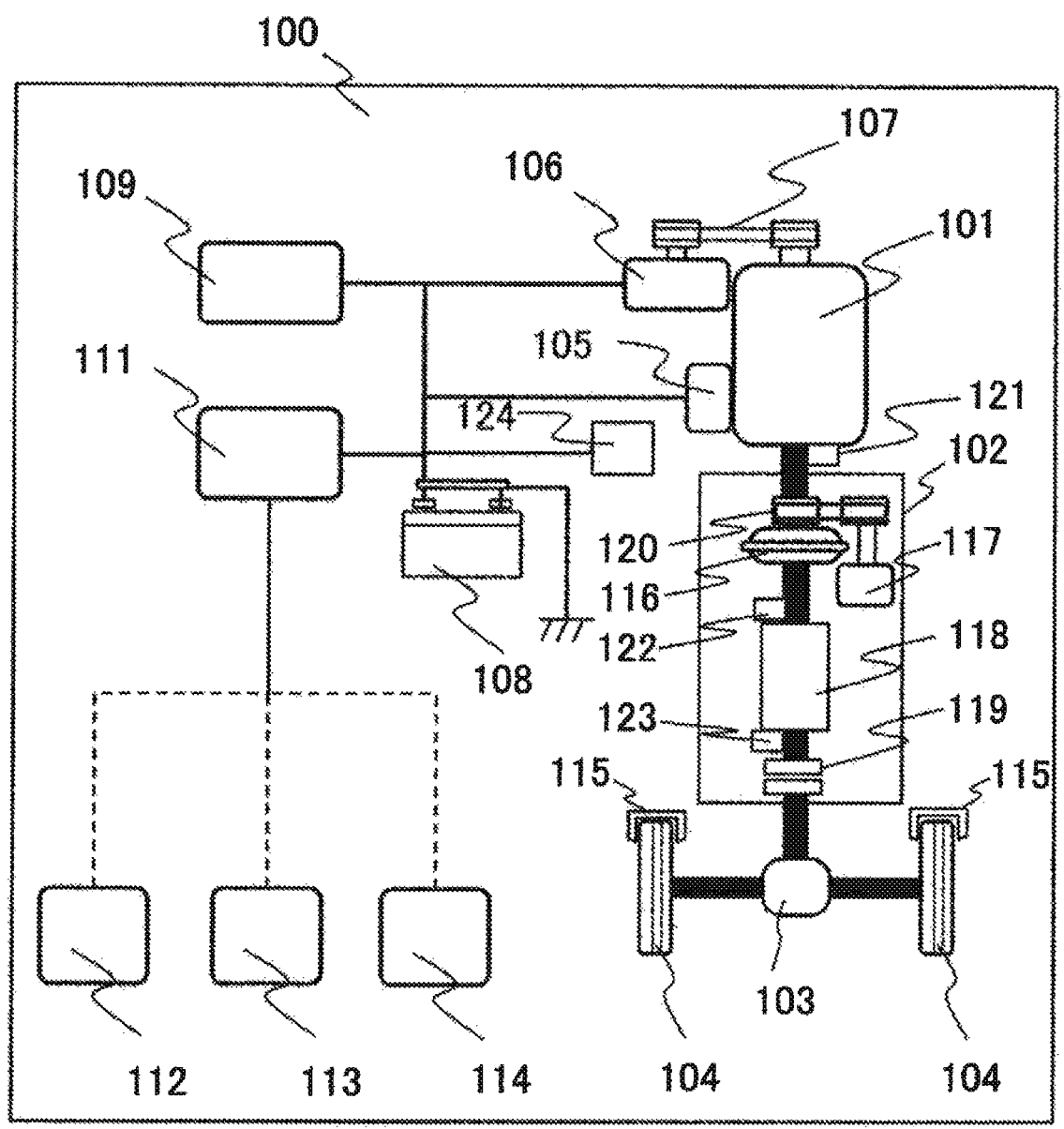
FIG. 1 is a diagram illustrating a configuration of a vehicle 100 provided with a vehicle control device (controller) 111 according to a first embodiment.

FIG. 1 is a diagram illustrating a configuration of a vehicle 100 provided with a vehicle control device (controller) 111 according to a first embodiment of the present invention. An engine 101 is mounted on the vehicle 100. The driving force generated by the engine 101 is transmitted to wheels 104 connected via a differential mechanism 103 through a transmission 102, thereby causing the vehicle 100 to run. In order to decelerate the vehicle 100, the wheels 104 are provided with a brake mechanism 115. The braking force is changed by a pressing amount of a brake pad in the brake mechanism 115, and the speed of the vehicle 100 is adjusted.

The transmission 102 includes a torque converter 116, a transmission oil pump 117, a transmission mechanism 118, and a clutch mechanism 119. The clutch mechanism 119 can transmit and cut off power from the engine 101 to the wheels 104. The transmission oil pump 117 is driven via an oil pump driving chain 120. The transmission mechanism 118 is not limited to a stepped transmission, but may be a continuously variable transmission in which a belt or a chain and a pulley are combined with each other. The clutch mechanism 119 may be provided between the oil pump driving chain 120 and the transmission mechanism 118, without being limited to be disposed between the transmission mechanism 118 and the differential mechanism 103. The transmission 102 includes a transmission input rotation speed sensor 122 which measures the rotation speed of the input shaft, and a transmission output rotation speed sensor 123 which measures the rotation speed of the output shaft. When the engine 101 stops during a sailing stop or the like, since the transmission oil pump 117 cannot be driven, the hydraulic pressure for maintaining the transmission ratio is insufficient. Therefore, in order to secure the hydraulic pressure of the transmission 102 during stop of the engine 101, an electric oil pump 124 for the transmission is provided. By supplying the electric power from a battery 108 to the electric oil pump 124, a necessary hydraulic pressure is secured.

A starter motor 105 is assembled to the engine 101 as a startup device. The starter motor 105 is driven by supplying the electric power from the battery 108, and the engine 101 also rotates in conjunction with the rotation of the starter motor 105. A motor having functions of a starter motor and a generator may be used as the engine startup device, without being limited to the starter motor 105. An engine rotation speed sensor 121 for detecting the rotation speed is attached to the engine 101. The engine 101 is started by driving the starter motor 105 to start the fuel supply and ignition when the engine rotation speed reaches a predetermined value or higher.

A generator 106 is connected to the engine 101 via a drive belt 107. The generator 106 can generate electric power by being rotated in accordance with the rotation of the crankshaft. The generator 106 has a mechanism for varying the generated voltage by controlling the field current and can stop the power generation output. The electric power generated by the generator 106 is supplied to the battery 108, an in-vehicle electric component 109, and the controller 111. The in-vehicle electric component 109 includes an actuator (for example, a fuel supply device, and an ignition device) for operating the engine 101, a lighting device such as a headlight, a brake lamp, and a turn signal indicator, and an air conditioner such as a blower fan and a heater. The controller 111 controls the in-vehicle electric component 109 including these components.

An accelerator pedal depression amount sensor 112 for detecting the depression amount of the accelerator pedal, a brake pedal depression amount sensor 113 for detecting the depression amount of the brake pedal, and a vehicle speed sensor 114 for detecting the speed of the vehicle are connected to the controller 111, and information detected by these sensors is input to the controller 111.

The brake mechanism 115 may be provided not only with a mechanism for controlling the braking force by changing a pressing amount of the brake pad in accordance with the brake pedal depression amount of the driver, but also an electric actuator mechanism capable of changing the pressing amount by a command value from the controller 111.

Figure 2:
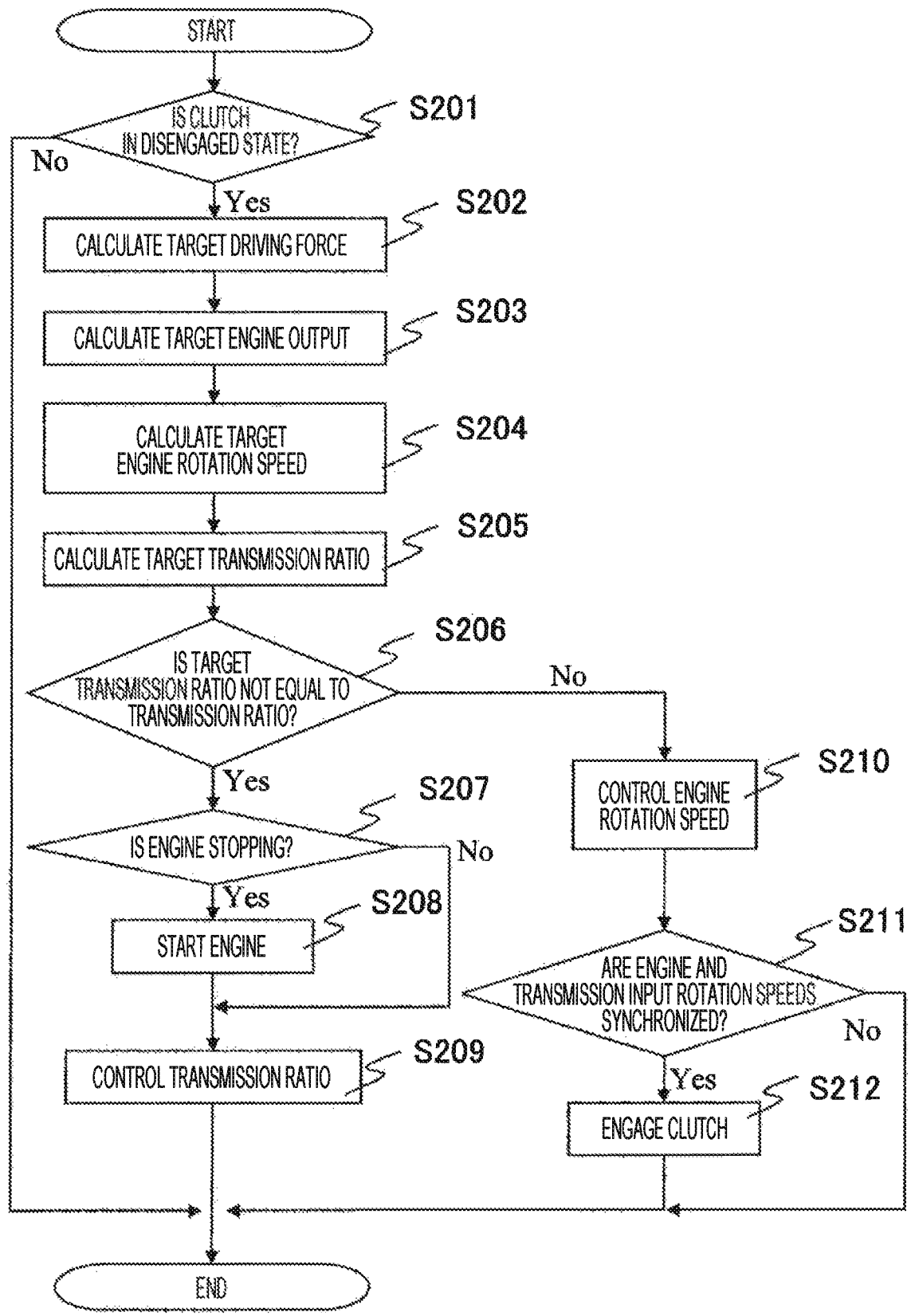
FIG. 2 is a flowchart illustrating a process in which the controller 111 controls an operation of an engine 101.

FIG. 2 is a flowchart illustrating a process in which the controller 111 controls the operation of the engine 101. The controller 111 controls the operation of the engine 101, for example, by periodically executing the flowchart. Each step of FIG. 2 will be described below.

(FIG. 2: Step S201)

The controller 111 determines whether the clutch mechanism 119 is disengaged or engaged. Specifically, the state of the clutch mechanism 119 is determined, using methods such as, (a) a method for measuring the engagement pressure of the clutch mechanism 119 using the oil pressure sensor, and (b) a method for determining that the clutch mechanism 119 is in the disengaged state when there is a difference in the rotation speeds between the transmission output rotation speed sensor 123 and the vehicle speed. When it is determined that the clutch mechanism 119 is in the disengaged state, the process proceeds to S202, and when it is determined that the clutch mechanism 119 is in the engaged state, the present flowchart is ended.

(FIG. 2: Step S202)

The controller 111 calculates a target driving force $F_t$ in accordance with the vehicle speed detected by the vehicle speed sensor 114 and the accelerator opening degree detected by the accelerator pedal depression amount sensor 112. Details of this step will be described again with reference to FIG. 3 which will be described later.

(FIG. 2: Step S203)

The controller 111 calculates the target engine output $P_{t\_e}$ in accordance with the following formula (1). In the formula, $F_t$ is a target driving force, M is a vehicle weight, $C_d$ is an air resistance coefficient, S is a front projection area of the vehicle, V is a vehicle speed, μ is a rolling resistance coefficient, g is a gravitational acceleration, and θ is a road surface gradient, respectively.

[Formula 1]

$$P_{t\_e}=(F_t+C_dSV^2+\mu Mg\cos\theta+Mg\sin\theta)\times V \quad (1)$$

(FIG. 2: Step S204)

The controller 111 calculates the target engine rotation speed on the basis of the target engine output. Details of this step will be described with reference to FIGS. 4 to 5 which will be described later.

(FIG. 2: Step S205)

The controller 111 calculates the target transmission ratio on the basis of the target engine output, the vehicle speed, the accelerator opening degree, and the transmission output rotation speed. Details of this step will be described with reference to FIG. 6 which will be described later.

(FIG. 2: Step S206)

The controller 111 determines whether or not the actual transmission ratio has reached the target transmission ratio. If the target transmission ratio is different from the actual transmission ratio, the process proceeds to S207. If the target transmission ratio becomes equal to the actual transmission ratio, the process proceeds to S210. This step is to drive the engine at an operating point with high engine efficiency by first controlling the transmission ratio before controlling the engine rotation speed.

(FIG. 2: Step S207)

The controller 111 determines whether or not the engine 101 is in a stopped state on the basis of the detection result of the engine rotation speed sensor 121. More specifically, by shifting from a state in which the fuel supply to the engine 101 is cut off to a state for supplying fuel again, when reaching the minimum engine rotation speed (400 to 500 r/min) at which engine idling can be resumed, it is determined that the engine 101 is operating. Otherwise, it is determined that the engine 101 is stopped. If the engine 101 is stopped, the process proceeds to step S208, and otherwise, the process skips to step S209.

(FIG. 2: Step S208)

The controller 111 performs cranking until the engine rotation speed reaches a predetermined rotation speed by the engine startup device, and performs the fuel supply and ignition after predetermined conditions are satisfied. As a result, the engine 101 is restored to the above idling rotation speed or higher.

(FIG. 2: Step S209)

The controller 111 supplies a predetermined hydraulic pressure to the transmission mechanism 118, thereby controlling the transmission mechanism 118 to achieve the target transmission ratio.

(FIG. 2: Step S210)

After the actual transmission ratio reaches the target transmission ratio, the controller 111 controls throttle, ignition timing, and the like so as to raise the engine rotation speed to the transmission input rotation speed.

(FIG. 2: steps S208 and S210: Supplement)

When the actual transmission ratio reaches the target transmission ratio in step S208 and then the process proceeds to step S210, there is a possibility that the timing of controlling the engine rotation speed will be delayed, which leads to an acceleration delay. Therefore, for example, a suitable means may detect that the time, at which the actual transmission ratio reaches the target transmission ratio, falls within a predetermined value, and the process may proceed from step S208 to S210 at that timing.

(FIG. 2: Step S211)

The controller 111 determines whether or not the engine rotation speed and the transmission input rotation speed are synchronized (that is, the difference between the engine rotation speed and the transmission input rotation speed becomes equal to or less than a predetermined value). If the engine rotation speed and the transmission input rotation speed are synchronized, the process proceeds to step S212, and if the engine rotation speed and the transmission input rotation speed are not synchronized, the present flowchart is ended.

(FIG. 2: Step S211)

The controller 111 gradually supplies a predetermined hydraulic pressure to the clutch mechanism 119, thereby smoothly engaging the clutch.

Figure 3:
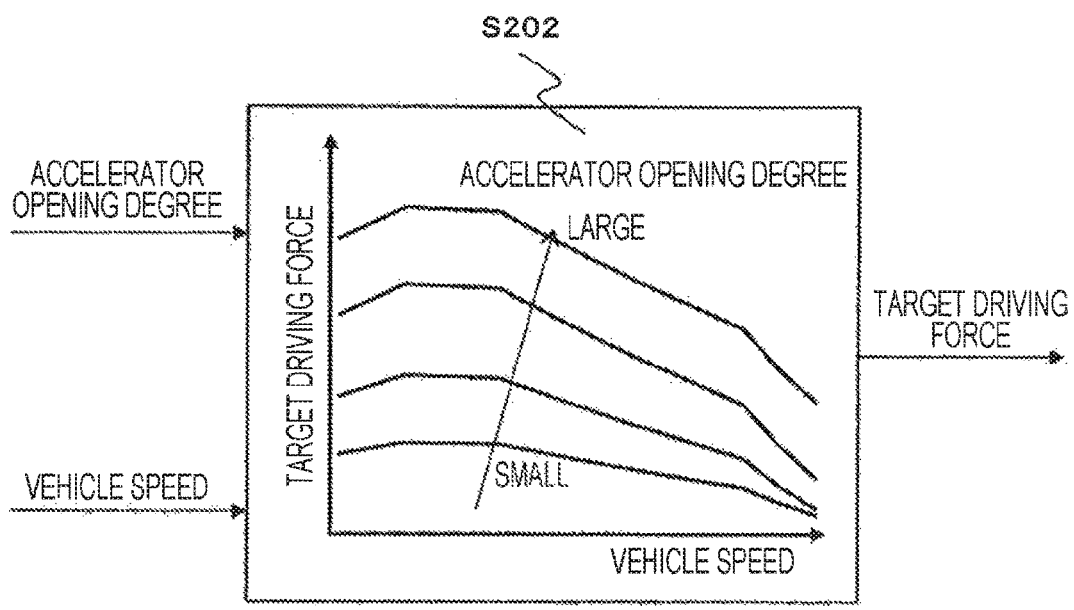
FIG. 3 is a diagram illustrating the details of step S202.

FIG. 3 is a diagram illustrating the details of step S202. The controller 111 executes a control calculation so that the target driving force increases as the accelerator opening degree increases. The relation between the accelerator opening degree/the vehicle speed/the target driving force is, for example, as exemplified in FIG. 3. The relation between these parameters exemplified in FIG. 3 can be stored in advance in a suitable storage device, as a parameter such as a control map.

Figure 4:
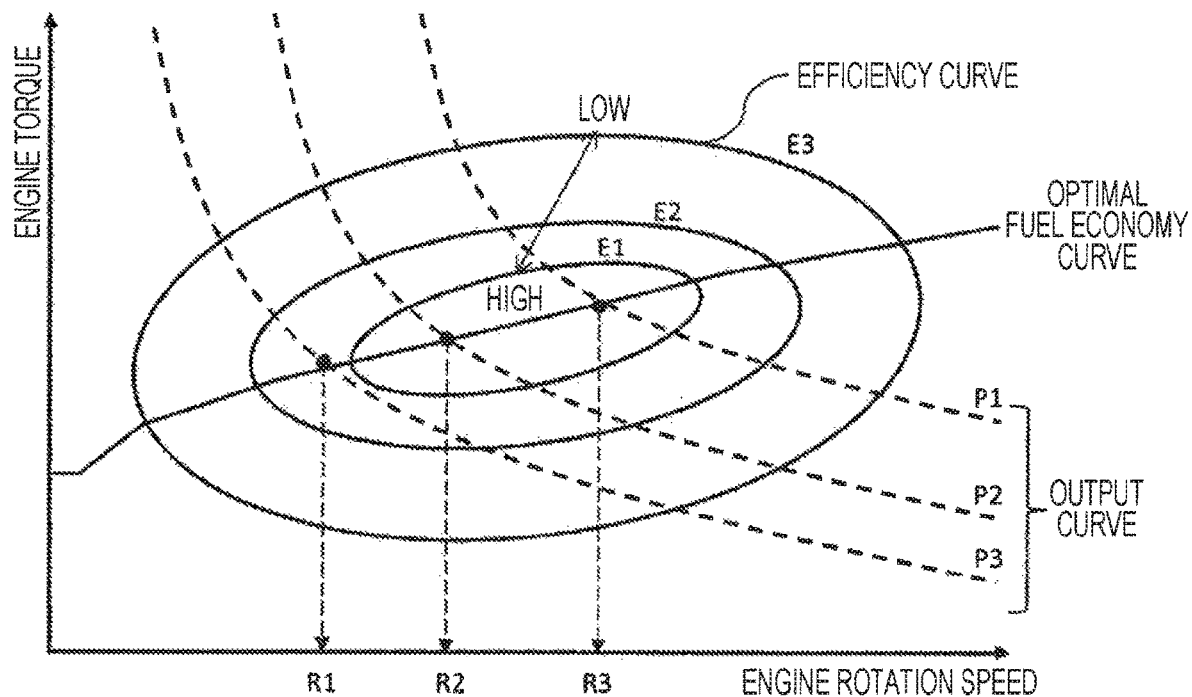
FIG. 4 is an exemplary view illustrating an efficiency curve (solid line) and an equal output curve (broken line) of the engine.

FIG. 4 is an exemplary view illustrating an efficiency curve (solid line) and an equal output curve (broken line) of the engine. In FIG. 4, a horizontal axis represents the engine rotation speed, and a vertical axis represents the engine torque. As illustrated by the engine efficiency curves (E1, E2, and E3), the engine efficiency is generally the highest at the center of the ellipse, and the farther away from the center is, the lower efficiency is. In FIG. 4, one obtained by connecting the most efficient points among the equal output curves (P1, P2, and P3) of the engine is represented as an optimum fuel efficiency curve.

As illustrated in FIG. 4, in order to efficiently operate the engine, while obtaining a certain target engine output, it is necessary to control the engine to obtain the optimum engine rotation speed corresponding to the target engine output. For example, when the target engine output is P1, it is necessary to control the engine with R1 as the target engine rotation speed.

Figure 5:
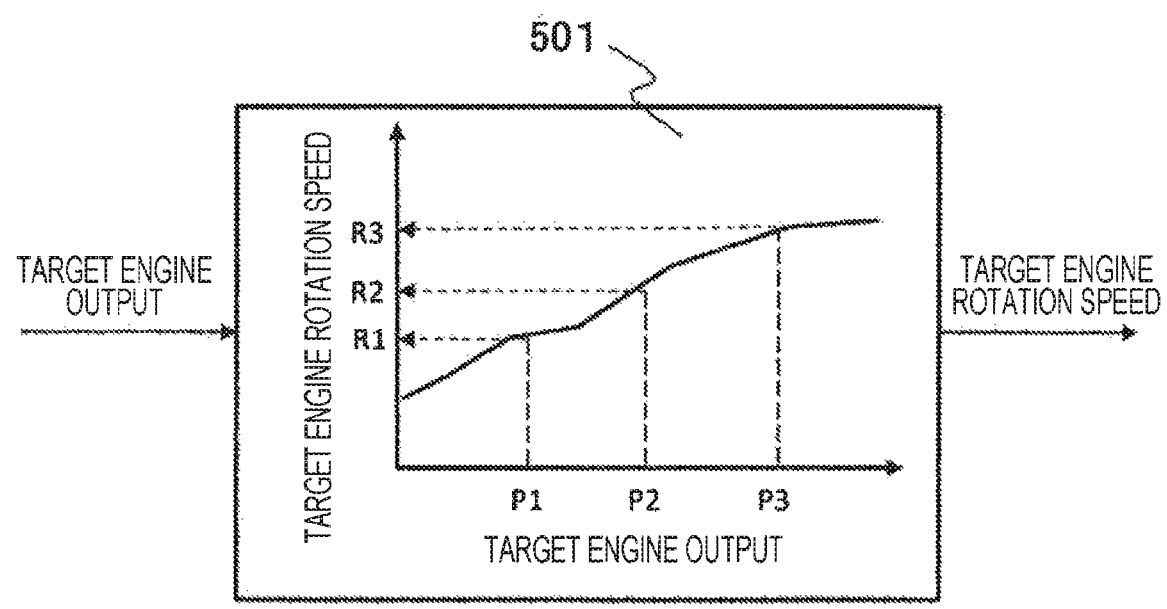
FIG. 5 is an example of a control map 501 used when the controller 111 obtains a target engine rotation speed based on a target engine output.

FIG. 5 illustrates an example of a control map 501 used when the controller 111 obtains the target engine rotation speed based on the target engine output. Since the engine efficiency characteristics differ depending on the type of the engine, the relation between the target engine output and the optimum target engine rotation speed corresponding thereto (relation as illustrated in FIG. 4) is previously derived, and the control map 501 with the relation described thereon can be stored in a suitable storage device in advance. The controller 111 can calculate the target engine rotation speed, using the control map 501.

Figure 6:
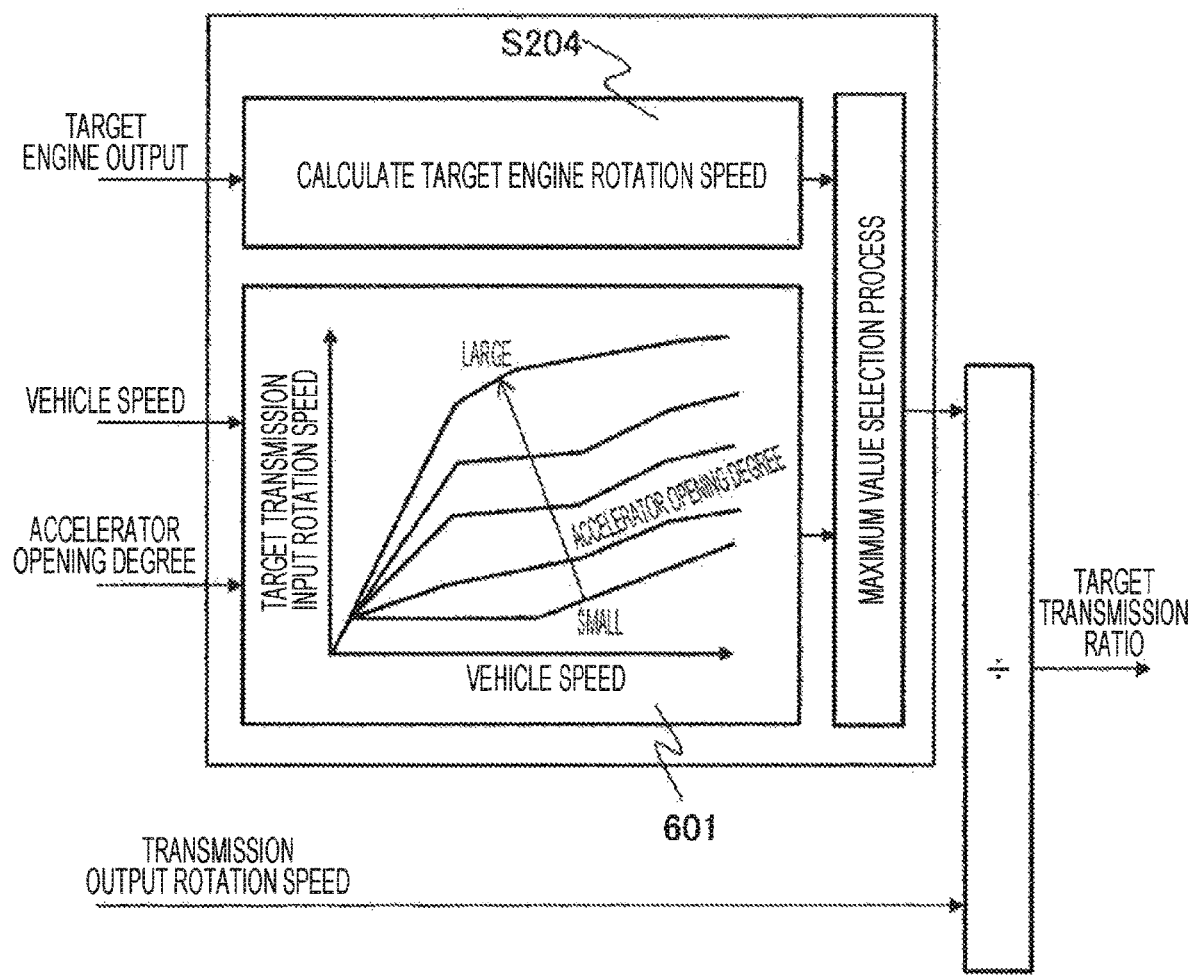
FIG. 6 is a diagram illustrating a processing procedure in step S205.

FIG. 6 is a diagram illustrating the processing procedure in step S205. The controller 111 calculates the target transmission input rotation speed on the basis of the vehicle speed and the accelerator opening degree. For example, the relation between the target transmission input rotation speed/the vehicle speed/the accelerator opening degree can be stored in a suitable storage device in advance as the target transmission input rotation speed map 601 after being calculated. The target transmission input rotation speed map 601 is set so that the target transmission input rotation speed increases as the accelerator opening degree increases. The controller 111 can calculate the target transmission input rotation speed, using the target transmission input rotation speed map 601.

The controller 111 uses the larger one between the target engine rotation speed calculated in step S204 and the target transmission input rotation speed calculated on the basis of the target transmission input rotation speed map 601, as the final target transmission input rotation speed which is input to the transmission 102. As a result, when the target output is large, since the small transmission ratio is not selected, the fuel efficiency can be improved, while ensuring the acceleration performance.

The controller 111 calculates the target transmission ratio, by dividing the finally used target transmission input rotation speed by the transmission output rotation speed detected by the transmission output rotation speed sensor 123.

Figure 7:
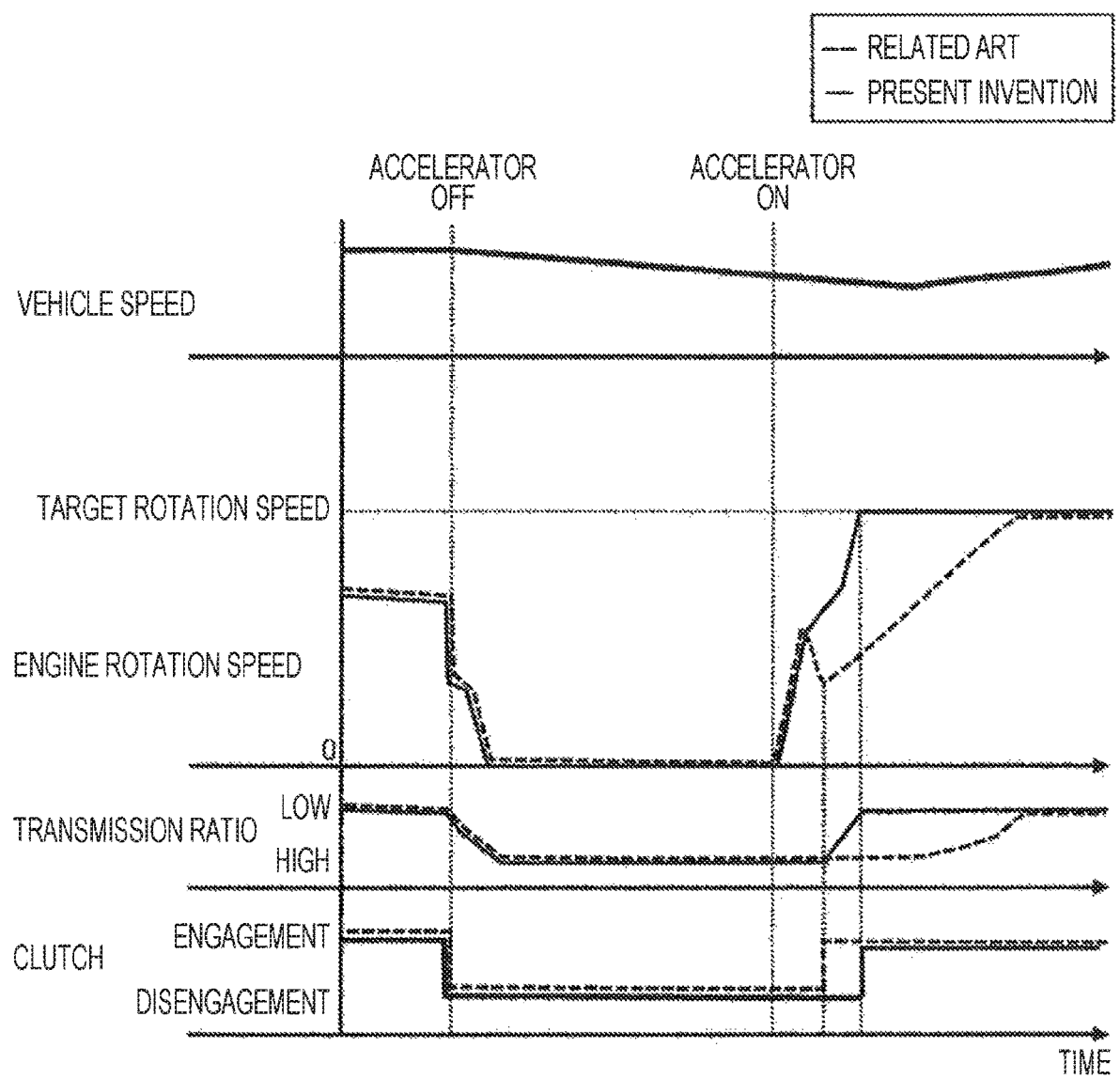
FIG. 7 is a time chart illustrating the change with time of each parameter in the first embodiment.

FIG. 7 is a time chart illustrating the change with time of each parameter in the first embodiment. In FIG. 7, the change with time of each parameter obtained by the conventional control is indicated by a dotted line, and the change with time of each parameter obtained by the control of the first embodiment is indicated by a solid line.

When the controller 111 detects that the accelerator enters an OFF state, the controller 111 disengages the clutch. The engine rotation speed gradually decreases to 0, and the transmission ratio also changes from a low level to a high level. The operation after the accelerator enters the ON state differs between the conventional control and the control in the first embodiment.

In the conventional control, the transmission ratio is maintained until the clutch is engaged after the accelerator enters the ON state. After the clutch is engaged, the transmission ratio is controlled until the target rotation speed is obtained. Therefore, since the engine is driven at the rotation speed with the low engine efficiency, the fuel economy deteriorates.

In the control according to the first embodiment, when the accelerator enters the ON state, the transmission ratio is shifted to a low level (see S206 to S209), and the clutch is engaged after shifting the transmission input rotation speed to the target rotation speed (see S210 to S212). Thus, since the engine 101 is driven at the rotation speed with high engine efficiency, the fuel economy can be improved.

First Embodiment: Summary

The controller 111 according to the first embodiment controls the transmission ratio up to the target transmission ratio before increasing the engine rotation speed, then controls the engine rotation speed, and then engages the clutch. This makes it possible to drive the engine 101 at a rotation speed with high engine efficiency, thereby improving the fuel economy.

Second Embodiment

In the second embodiment of the present invention, an example in which the control method described in the first embodiment is applied to the automatic acceleration/deceleration control of repeating the sailing stop and acceleration within a preset vehicle speed range will be described. Since a vehicle 100 and its constituent elements are the same as those of the first embodiment, the differences will be mainly described below.

Figure 8:
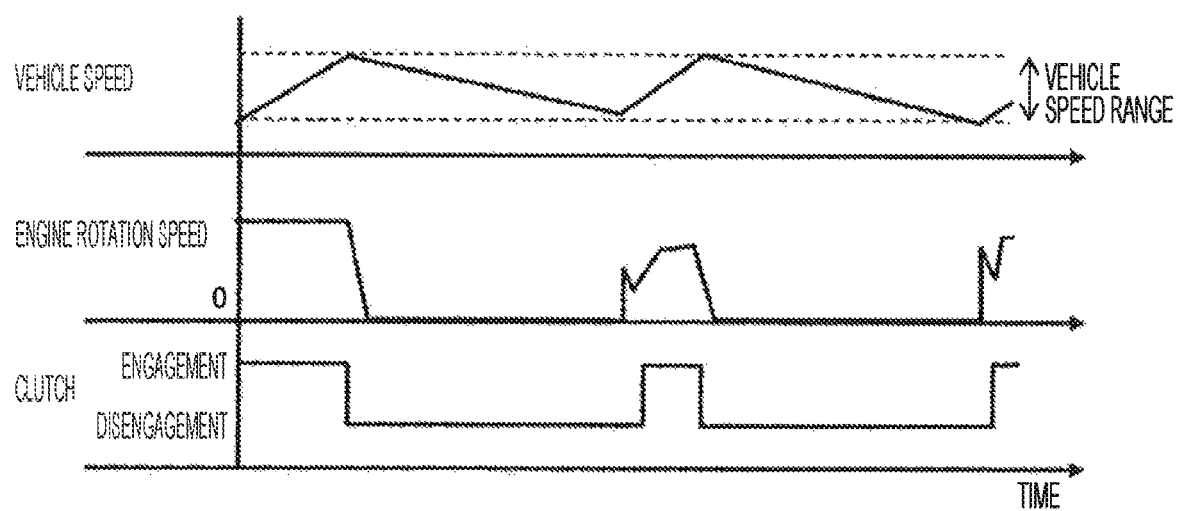
FIG. 8 is a time chart illustrating an automatic acceleration/deceleration control in which sailing stop and acceleration are repeated within a prescribed vehicle speed range.

FIG. 8 is a time chart illustrating the automatic acceleration/deceleration control in which the sailing stop and acceleration are repeated within the prescribed vehicle speed range. A controller 111 accelerates the vehicle 100 until the vehicle speed reaches the set upper limit vehicle speed. When the vehicle 100 reaches the upper limit vehicle speed, the clutch is disengaged and an engine 101 is stopped, and the sailing stop is performed. Thereafter, when the vehicle 100 reaches the lower limit vehicle speed, the engine 101 is restarted, the clutch is engaged, and then the vehicle 100 is accelerated. Thereafter, the same control procedure is repeated.

Figure 9:
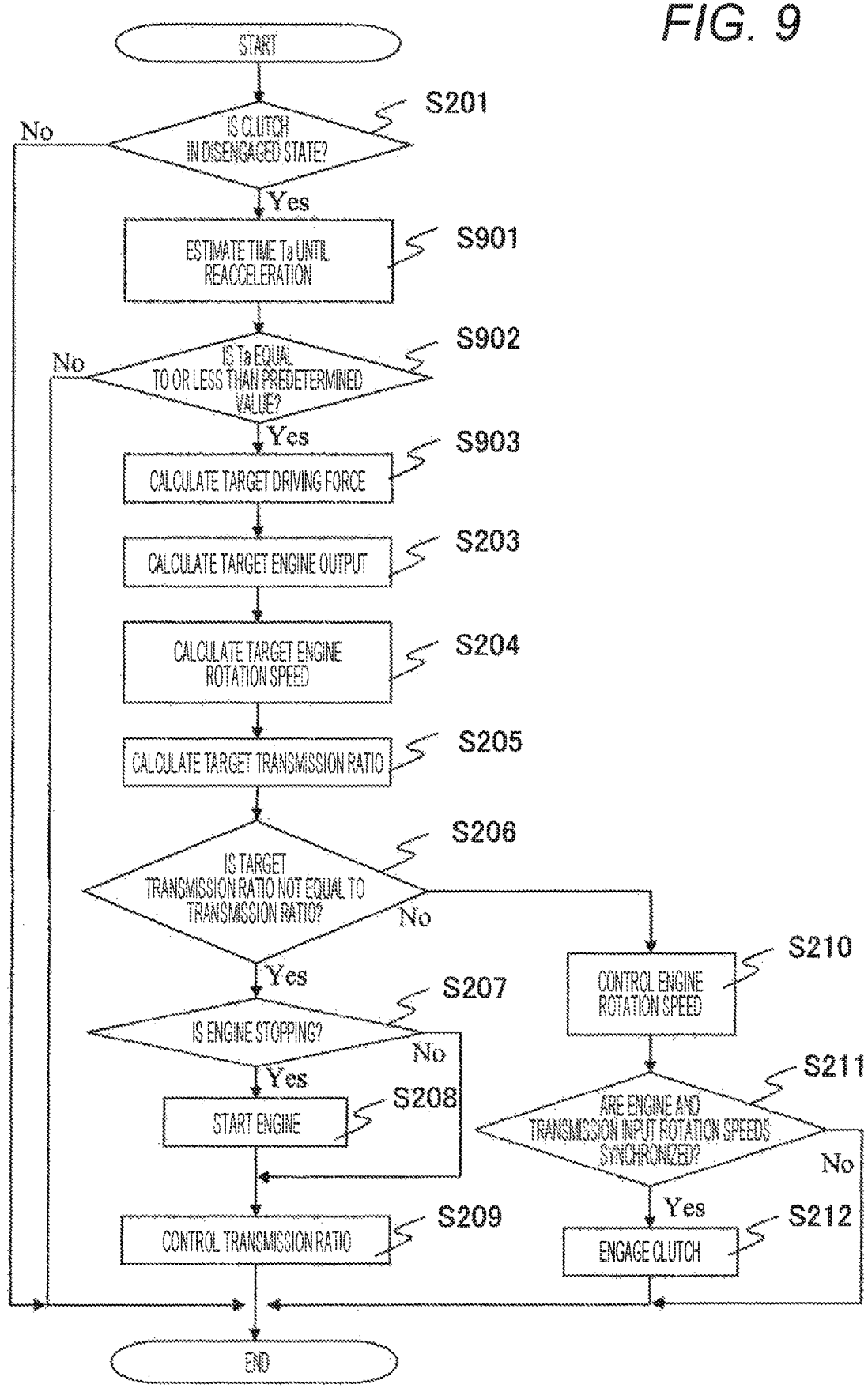
FIG. 9 is a flowchart illustrating a process in which the controller 111 controls the operation of the engine 101 in a second embodiment.

FIG. 9 is a flowchart illustrating a process in which the controller 111 controls the operation of the engine 101 in the second embodiment. Here, as illustrated in FIG. 8, a flowchart in which the control procedure of the first embodiment is applied to the automatic acceleration/deceleration control in which the sailing stop and acceleration are repeated within the prescribed vehicle speed range will be described. The same steps as those in FIG. 2 will not be described, and additionally changed steps will be described.

(FIG. 9: Step S901)

The controller 111 performs this step after step S201. The controller 111 estimates the time $T_a$ until the next reacceleration of the vehicle 100 is started at the time when the vehicle is running in the clutch disengaging state. First, the vehicle acceleration $\alpha_s$ in the clutch disengaging state is calculated in accordance with the following formula (2).

[Formula 2]

$$\alpha_s = -\frac{1}{M}C_d SV^2 - \mu g\cos\theta - g\sin\theta \qquad (2)$$

When the vehicle 100 is running within the prescribed vehicle speed range, the estimated time $T_a$ until reacceleration during running in the clutch disengaging state can be calculated by the following formula (3). In the formula, $V_0$ represents the current vehicle speed, and V represents the vehicle speed at which the acceleration starts.

[Formula 3]

$$T_a = \frac{V_0 - V}{\alpha_3} \qquad (3)$$

(FIG. 9: Step S902)

If the time $T_a$ until the reacceleration is within the predetermined value, the controller 111 proceeds to step S903. Otherwise, the controller 111 continues the sailing stop by ending this flowchart. The predetermined value to be compared with $T_a$ is, for example, a value obtained by adding the engine startup time Te and the shift delay time Tt of the transmission 102. Alternatively, the larger one of Te and Tt may be set as a predetermined value. The engine startup time Te is defined as a time until, for example, the engine is cranked and the engine rotation speed reaches a value larger than the idling rotation speed.

(FIG. 9: Step S903)

In addition to the process described in step S202, the controller 111 performs the following process. The controller 111 calculates a vehicle speed difference between the upper limit vehicle speed and the actual vehicle speed, and sets the target acceleration $\alpha_t$ to be larger as the vehicle speed difference is larger. The maximum value of the target acceleration $\alpha_t$ is a value regulated by laws and regulations. The controller 111 calculates the target driving force $F_a$ at the time of acceleration of the automatic acceleration/deceleration control in accordance with the following formula (4). In formula (4), $\alpha_t$ represents the target acceleration at the time of automatic acceleration/deceleration, and M represents the vehicle weight. The controller 111 compares the calculated target driving force $F_a$ with the target driving force $F_t$ calculated in accordance with the step S202, and adopts the larger one as the target driving force. In step S203 and subsequent steps, the target driving force that is finally adopted is used.

[Formula 4]

$$F_a = \alpha_1 M \qquad (4)$$

Figure 10:
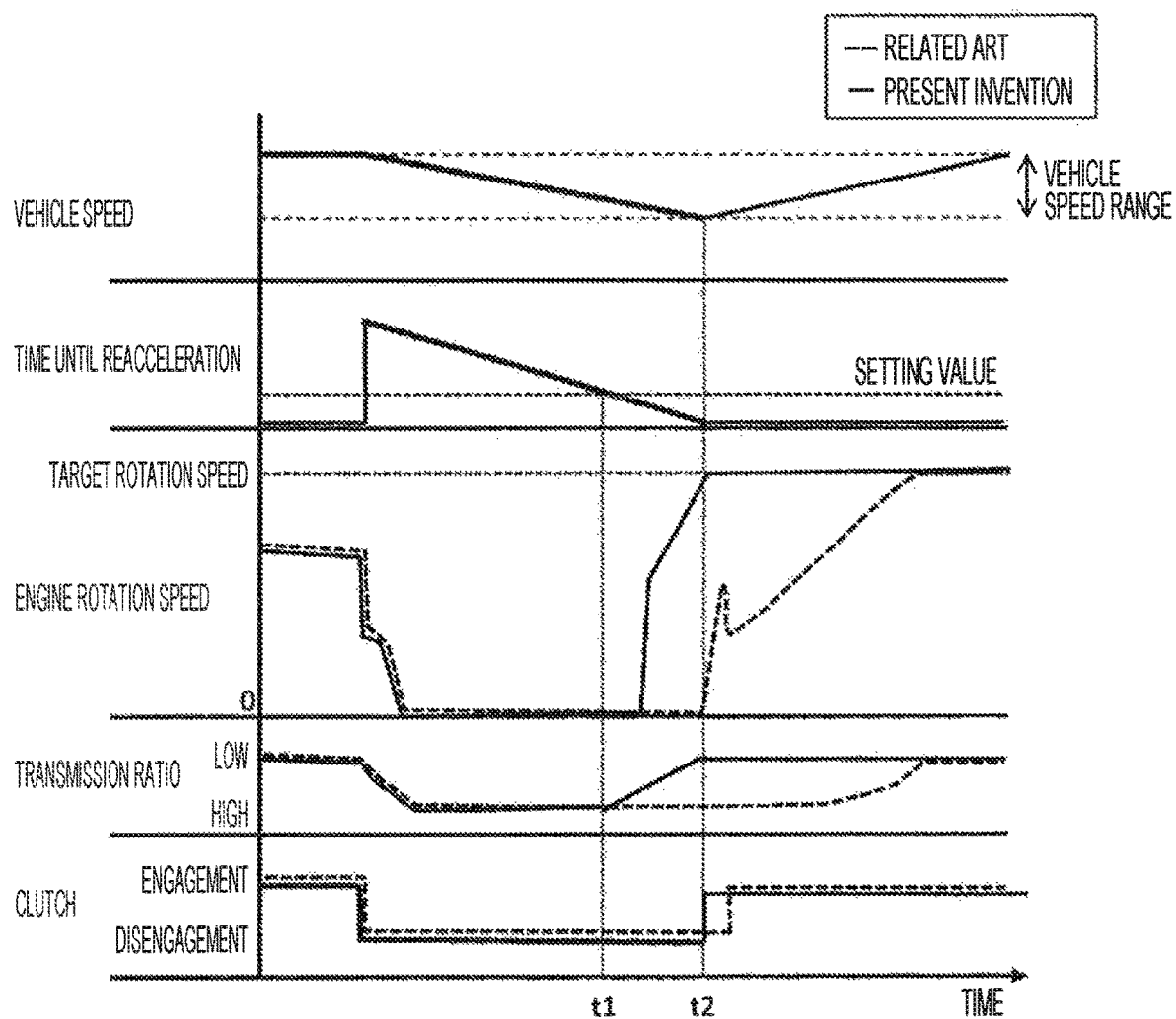
FIG. 10 is a time chart illustrating the change with time of each parameter in the second embodiment.

FIG. 10 is a time chart illustrating the change with time of each parameter in the second embodiment. In FIG. 10, the change with time of each parameter obtained by the conventional control is indicated by a dotted line, and the change with time of each parameter obtained by the control of the second embodiment is indicated by a solid line.

In the conventional control, the engine 101 is started at the time $t_2$ at which acceleration starts from the sailing stop state, and after the clutch engagement, the transmission ratio is controlled so that the engine rotation speed reaches the target value.

In the control according to the second embodiment, at the time $t_1$ when the time until the start of the reacceleration becomes equal to or less than the predetermined value, the transmission ratio is controlled in the engine stop state, the clutch is engaged after the engine 101 is started, and the acceleration control is performed. Therefore, as compared with the conventional control, since the engine 101 is accelerated at an operating point with high engine efficiency, the fuel economy can be improved.

Third Embodiment

Figure 11:
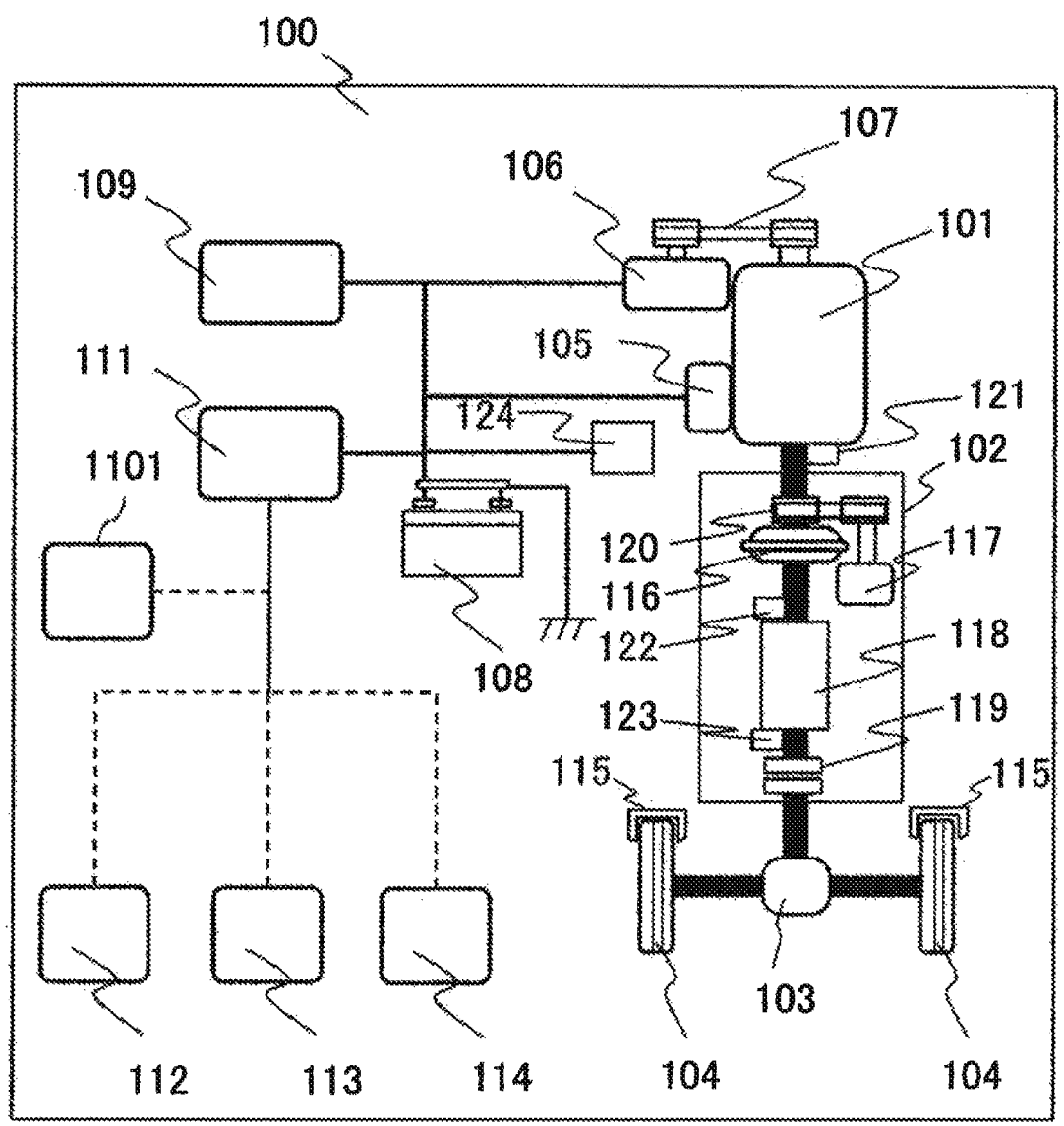
FIG. 11 is a diagram illustrating a configuration of a vehicle 100 provided with a controller 111 according to a third embodiment.

FIG. 11 is a diagram illustrating a configuration of a vehicle 100 provided with a controller 111 according to a third embodiment of the present invention. In the third embodiment, the vehicle 100 includes a front situation recognition sensor 1101 in addition to the configuration described in the first embodiment. The front situation recognition sensor 1101 includes at least one means for detecting a front situation of the vehicle 100, such as a navigation system, a camera, a radar, an inter-vehicle communication or a road-to-vehicle communication module. The controller 111 can acquire the inter-vehicle distance or the relative speed (the preceding vehicle speed—own vehicle speed) between the vehicle 100 and the preceding vehicle, on the basis of the detection result of the front situation recognition sensor 1101.

Figure 12:
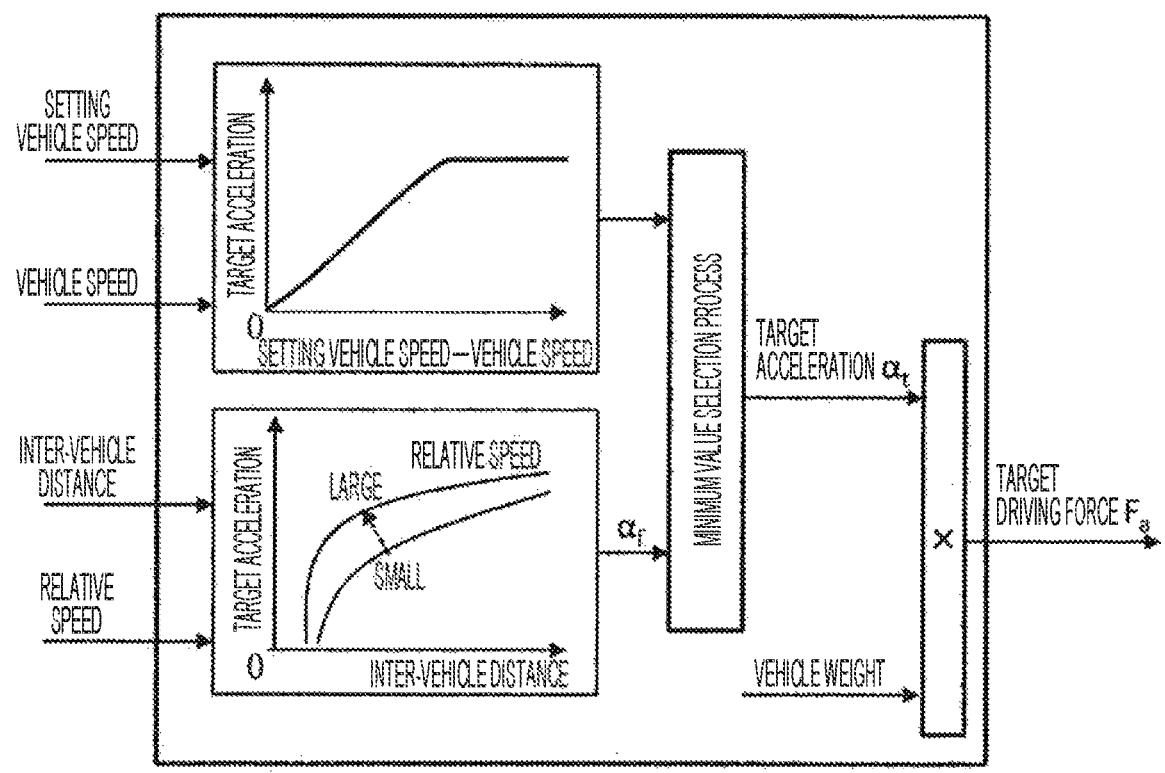
FIG. 12 is a diagram illustrating a procedure of calculating the target driving force in the constant speed running state by the controller 111 in the third embodiment.

FIG. 12 is a diagram illustrating a procedure of calculating the target driving force in the constant speed running state by the controller 111 in the third embodiment. The controller 111 calculates the target acceleration $\alpha_f$ using the inter-vehicle distance and the relative speed to the preceding vehicle as input parameters. The controller 111 further calculates the target acceleration on the basis of the difference between the set vehicle speed and the actual vehicle speed in the constant speed running state as input parameters.

The controller 111 compares the two calculated target accelerations and adopts the smaller one as the target acceleration $\alpha_t$. The controller 111 obtains the target driving force $F_a$ by multiplying the target acceleration $\alpha_t$ by the vehicle weight M. As a result, when the preceding vehicle is not detected, the constant speed running control is executed, and when the preceding vehicle is detected, the automatic acceleration/deceleration control can be executed to prevent collision.

The correspondence relation between each input parameter and the target acceleration can be stored in advance in a suitable memory device, for example, in the form of a control map or the like. The control map is set in advance so that the target acceleration at increases as the inter-vehicle distance increases and as the relative speed increases (that is, the preceding vehicle speed becomes larger than the own vehicle speed).

Fourth Embodiment

Figure 13:
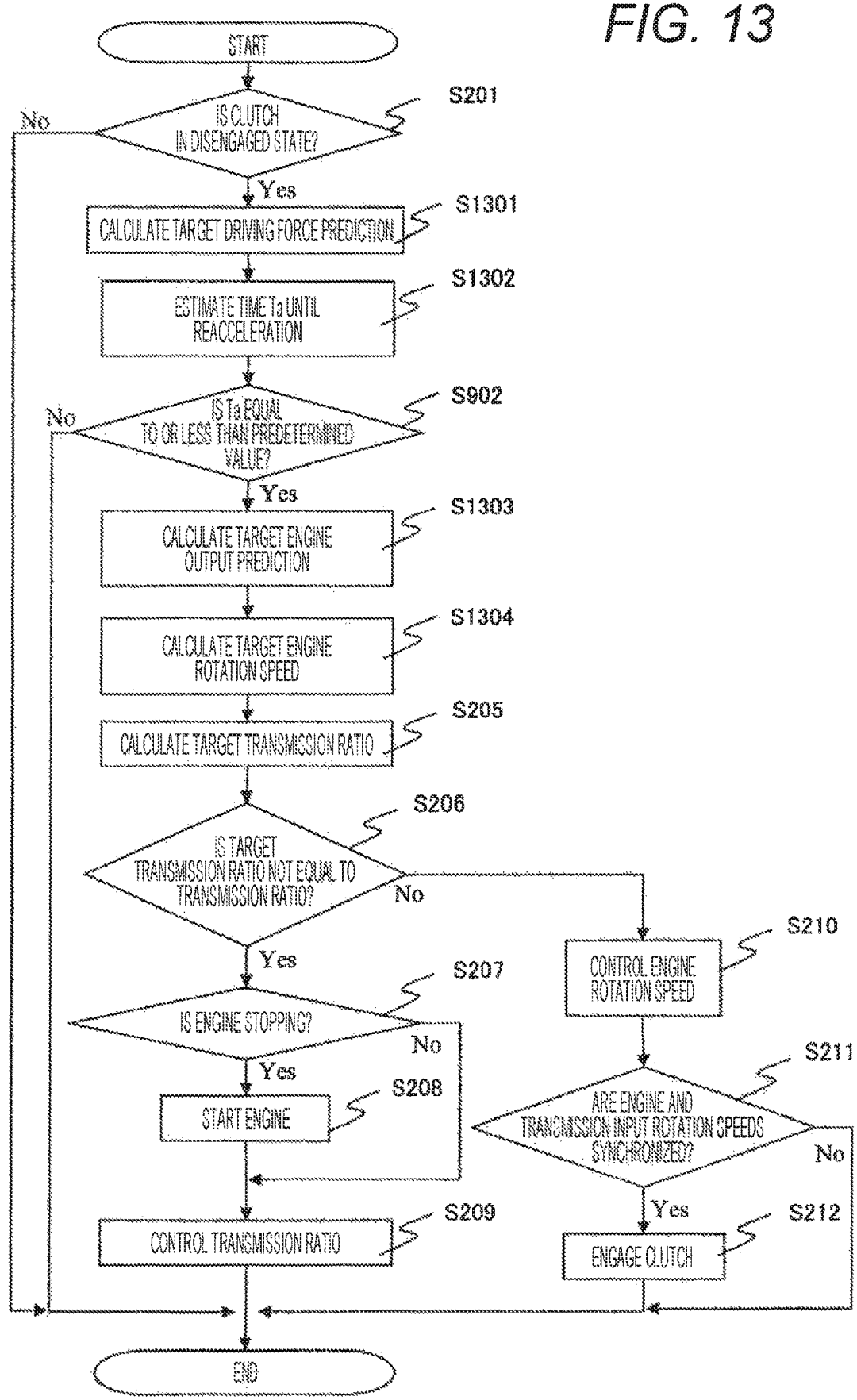
FIG. 13 is a flowchart illustrating a process in which the controller 111 controls the operation of the engine 101 in the vehicle 100 according to a fourth embodiment.

FIG. 13 is a flowchart illustrating a process in which a controller 111 controls the operation of an engine 101 in a vehicle 100 according to a fourth embodiment of the present invention. In the fourth embodiment, the vehicle 100 has the same configuration as that of the third embodiment. Since other configurations are the same as those of the third embodiment, differences will mainly be described below.

(FIG. 13: Step S1301)

The controller 111 executes this step and the following step S1302 in place of step S901. On the basis of information on the preceding vehicle at time t (position $X_p(t)$, and velocity $V_p(t)$), the controller 111 first assumes that the preceding person performs equal acceleration motion, and calculates the prediction values of each of the position and the speed of the preceding vehicle at time $t+t_n$ ($0 \leq t_n \leq t_{max}$) in accordance with the following formulas (5) and (6).

[Formula 5]

$$V_p(t + t_n) = V_p(t) + \alpha_p t_n \tag{5}$$

[Formula 6]

$$X_p(t + t_n) = X_p(t) + \frac{V_p(t + t_n)^2 - V_p(t)^2}{2\alpha_p} \tag{6}$$

Next, the controller 111 calculates prediction values of each of the position and velocity of the own vehicle at the time t+1 in accordance with the following formulas (7) and (8). It is also possible to calculate sequentially the prediction values also after time t+1.

[Formula 7]

$$V(t+1) = V(t) + \alpha_f(t) \tag{7}$$

[Formula 8]

$$X(t+1) = X(t) + V(t+1) \tag{8}$$

On the basis of the position $X_p(t)$ of the preceding vehicle, the speed $V_p(t)$ of the preceding vehicle, the position X(t) of the own vehicle, and the speed V(t) of the own vehicle, the controller 111 calculates the prediction value D(t) of the inter-vehicle distance and the prediction value $V_r(t)$ of the relative speed at the time t in accordance with the following formulas (9) and (10). The time subsequent to the time t can also be similarly calculated.

[Formula 9]

$$V_r(t) = V_p(t) - V(t) \tag{9}$$

[Formula 10]

$$D(t) = X_p(t) - X(t) \tag{10}$$

On the basis of the prediction value D(t) of the inter-vehicle distance and the prediction value $V_r(t)$ of the relative speed, the controller 111 calculates the target acceleration prediction value $\alpha_f(t)$ of the own vehicle in accordance with the procedure described in FIG. 12. It is also possible to similarly calculate the target acceleration prediction values $\alpha_f(t+1)$ to $\alpha_f(t+t_n)$ at the times t+1 to $t+t_n$. The controller 111 calculates the target driving force prediction values $F_a(t), \ldots, F_a(t+t_n)$ on the basis of the product of the target acceleration prediction values $\alpha_f(t), \ldots, \alpha_f(t+t_n)$ and the vehicle weight M.

(FIG. 13: Step S1302)

The controller 111 adopts the time from the current time t to the time until one of the target driving force prediction values $F_a(t), \ldots, F_a(t+t_n)$ becomes greater than 0, as $T_a$ in step S901.

(FIG. 13: Step S1303)

Instead of steps S902 to S204 in FIG. 9, the controller 111 performs this step and the following step S1304. The controller 111 calculates the target engine output prediction value $P_e(t+t_n)$ at the time $t+t_n$ in accordance with the following formula (11).

[Formula 11]

$$P_e(t+t_n) = F_a(t+t_n) \times V(t+t_n) \quad (0 \le t_n \le t_{max}) \tag{11}$$

(FIG. 13: Step S1304)

The controller 111 calculates the target engine rotation speed on the basis of the average value of the target engine output prediction values. The processing image of this step will be described with reference to FIG. 14.

Figure 14:
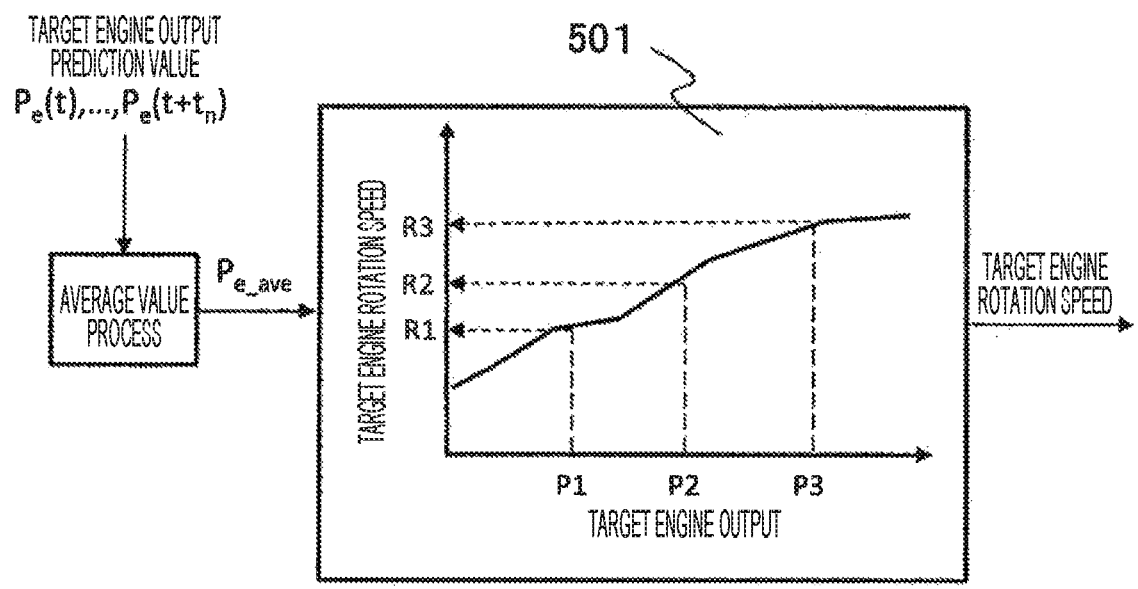
FIG. 14 is a diagram illustrating a processing image in step S1304.

FIG. 14 is a diagram illustrating a processing image in step S1304. The controller 111 calculates the average value $P_{e\_ave}$ of the target engine output prediction values $P_e(t)$ to $P_e(t+t_n)$ at each of the times t to $t+t_n$. The controller 111 calculates the target engine rotation speed, by applying the average value $P_{e\_ave}$ of the target engine output prediction value to the control map 501 described with reference to FIG. 5. As a result, it is possible to suppress vertical fluctuation of the engine rotation speed or the like, and to reduce unpleasant feeling or the like given to the driver.

Modified Example of Present Invention

The present invention is not limited to the above embodiments, and includes various modified examples. For example, the above-described embodiments have been described in detail in order to describe the present invention in an easy-to-understand manner, and are not necessarily limited to those having all the described configurations. Further, a part of the configuration of an embodiment can be replaced by the configuration of another embodiment, and the configuration of another embodiment can be added to the configuration of an embodiment. Further, it is possible to add, delete, or replace another configuration with respect to a part of the configurations of each embodiment.

In the above embodiments, the control map is used as the means for calculating each parameter, but other means may be used as long as it defines the relations between the parameters. For example, a function defining an equivalent relation can be used.

Each of the above-described configurations, functions, processing units, processing means, and the like may be achieved as hardware by designing part or all of them, for example, by an integrated circuit. Further, each of the above-described configurations, functions, and the like may be achieved as software when the processor interprets and executes a program that achieves each function. Information such as programs, tables, and files that achieve each function can be stored in a storage device such as a memory, a hard disk, and a solid state drive (SSD), and a storage medium such as an IC card, an SD card, and a DVD.

For example, each control process performed by the controller 111 can be achieved, when a control program is stored in advance in a storage device such as a memory included in the controller 111, and an operation device such as a central processing unit (CPU) included in the controller 111 executes the control program.

REFERENCE SIGNS LIST 100 vehicle
101 engine
102 transmission
103 differential mechanism
104 wheel
105 starter motor
106 generator
107 drive belt
108 battery
109 in-vehicle electric component
111 controller
112 accelerator pedal depression amount sensor
113 brake pedal depression amount sensor
114 vehicle speed sensor
115 brake mechanism
116 torque converter
117 transmission oil pump
118 transmission mechanism
119 clutch mechanism
120 oil pump driving chain
121 engine rotation speed sensor
122 transmission input rotation speed sensor
123 transmission output rotation speed sensor
124 electric oil pump
1101 front situation recognition sensor

The invention claimed is:

1. An apparatus comprising:
a vehicle control device that is configured to control an operation of a vehicle, wherein
while the vehicle is running in a cutoff state of a clutch configured to connect and disconnect a power transmission, before a rotation speed of an engine provided in the vehicle is increased, a transmission ratio of a transmission provided in the vehicle is controlled, and thereafter, the clutch is engaged,
the vehicle control device is configured to control the transmission ratio until the transmission ratio reaches a target transmission ratio before increasing the engine rotation speed,
after reaching the target transmission ratio the vehicle control device is configured to control the engine rotation speed, and then engages the clutch, and
when the vehicle control device detects that a time, at which the target transmission ratio is reached, falls within a predetermined value, the vehicle control device controls throttle and ignition timing, so as to raise the engine rotation speed to reach a transmission input rotation speed.

2. The apparatus according to claim 1, wherein when the vehicle is running in the cutoff state of the clutch and an operation amount of an accelerator pedal provided in the vehicle is 0, the transmission ratio is controlled before increasing the rotation speed of the engine, and thereafter, the clutch is engaged.

3. The apparatus according to claim 1, wherein when the vehicle is running in the cutoff state of the clutch and fuel injection to the engine is stopped, the transmission ratio is controlled before increasing the rotation speed of the engine, and thereafter, the clutch is engaged.

4. The apparatus according to claim 1, wherein after the clutch is engaged, the rotation speed of the engine is increased.

5. The apparatus according to claim 1,
wherein a target rotation speed of the engine is calculated after shifting from the cutoff state of the clutch to a state in which the clutch is engaged, and
the transmission is controlled to obtain the transmission ratio corresponding to a speed of the vehicle and the target rotation speed.

6. The apparatus according to claim 5,
wherein a target acceleration of the vehicle is calculated after shifting from the cutoff state of the clutch to a state in which the clutch is engaged, and
the target rotation speed is calculated on the basis of the target acceleration.

7. The apparatus according to claim 1, wherein the engine and the transmission are controlled to repeat coasting running of the cutoff state of the clutch and driving running in which the rotation speed of the engine is increased.

* * * * *